June 28, 1932.    W. L. EGY    1,864,895
VERNIER
Filed March 31, 1930
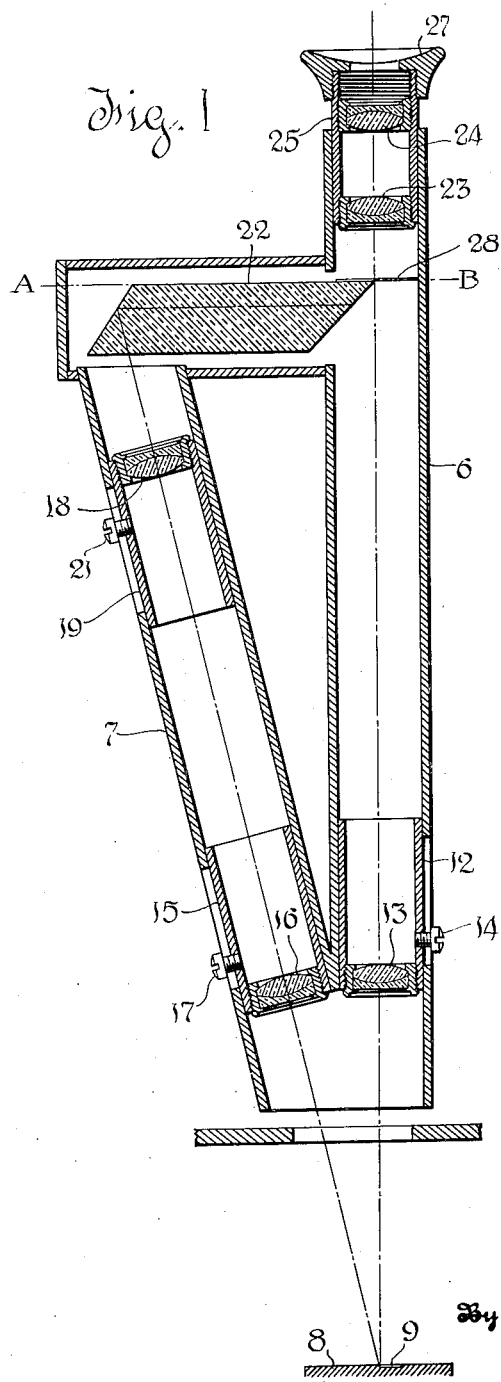
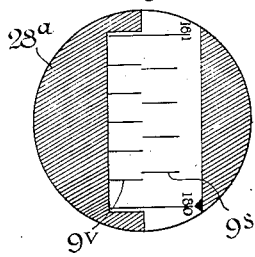
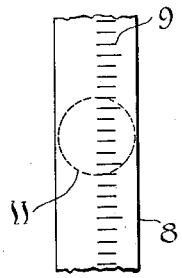
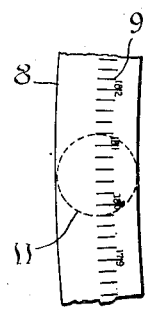
Inventor
Willard L. Egy
By Dodge and Sons
Attorneys Patented June 28, 1932

1,864,895

UNITED STATES PATENT OFFICE

WILLARD L. EGY, OF TROY, NEW YORK, ASSIGNOR TO W. & L. E. GURLEY, OF TROY, NEW YORK, A CORPORATION OF NEW YORK

VERNIER

Application filed March 31, 1930. Serial No. 440,426.

This invention relates to measuring instruments, and particularly to verniers.

Fractions of a division of any uniformly graduated scale are commonly read by mechanical verniers, which, to avoid errors caused by parallax, must be accurately in plane with the scale and as close to the edge thereof as is mechanically possible.

The vernier is divided by uniformly spaced graduations into a number of intervals corresponding to the denominator of the desired fractions, and the length of the vernier, between end graduations, subtends a number of graduations on the scale which is (for a direct reading vernier) one fewer or (for a reverse reading vernier) one more, than the number of graduations on the vernier. The vernier is read by counting to that division on the vernier which most nearly coincides with a graduation on the scale. The direct reading type is the one most commonly used.

Conventional verniers are difficult to construct and maintain, because their accuracy depends on the use of very minute clearances between the two scales, and they are very difficult to read, where the graduations are fine.

The present invention eliminates the mechanical difficulties and produces a vernier which is easily read. The invention is based on the broad concept that the vernier may be merely a magnified or reduced optical image of the scale itself. Differential motion between the scale and vernier is obviously necessary, and if the image appeared to move in the same direction as the scale, the differential motion would be slight, particularly for large denominators. An inverting optical system overcomes this difficulty by causing the image to appear to move in the opposite direction. It also presents an image of the edge of the scale in opposed relation to the edge of the scale itself.

The best results so far secured have been had by using two magnifying optical systems of different powers, one an erecting system which projects a real image of the scale, and the other an inverting system which projects an inverted real image which serves as the vernier. These two images are projected so that they are juxtaposed on the same focal plane. Their relative dimensions may be adjusted conveniently by the use of at least one optical system whose magnification can be varied by a focusing operation. Register of the edges of the images can be effected by shifting the two optical systems as a unit in a line parallel with the plane of the scale and transverse to the scale.

The invention may be applied by the use of microscopes or telescopes. Not only may it be used to read straight scales, but if the angle subtended by one division of the scale is small, it may also be used to read graduated arcs. This is the case in reading graduated limbs of surveying instruments. The principle may be applied to the reading of the graduations on stadia rods, and to the reading of various graduated scales.

In the accompanying drawing, a simple device for practicing the invention is illustrated and described. The drawing is to some extent diagrammatic, that is, only those elements which are essential to the inventive concept are illustrated.

In the drawing,—

Fig. 1 is a vertical axial section through a duplex microscope having a single eye-piece, the plane of section being taken through the axis of the two microscope tubes and being normal to the direction of motion of the graduated scale.

Fig. 2 is a fragmentary view of a right line scale, the field of the microscope being indicated in dotted lines.

Fig. 3 is a similar view showing an arcuate scale with radial graduations.

Fig. 4 illustrates the field of view as seen through the eye-piece of the microscope.

Referring first to Fig. 1, the tube of one microscope is indicated at 6 while the tube of the other microscope is illustrated at 7. The center lines of the two tubes intersect in the plane of the upper graduated surface of the scale 8 which is to be read. It will be understood that this scale moves in a right line which is normal to the plane of the paper in Fig. 1, or else moves in an arc having a radius long with respect to the arcs subtended by the graduations, the axis of rotation being substantially in the plane of the paper with reference to Fig. 1.

Fig. 2 shows the right line type of scale, and Fig. 3 shows an arcuate series of graduations. In each instance the graduations are indicated at 9, every fifth graduation being elongated, as is common in graduated scales.

The field of the microscopes is indicated by the dotted circle 11 in Figs. 2 and 3. By referring to Fig. 3 it will be noted that the arc subtended by this field is so small with reference to the radius of the arc that the graduations appear to be parallel.

In the microscope tube 6 is a focusing slide tube 12 which carries an objective 13, shown as a doublet. The focusing sleeve 12 is clamped by a screw 14. The microscope is preferably focused on the plane A—B. The tube 7 has a lower focusing sleeve 15 which carries an objective 16 and may be clamped in place by a screw 17. The objective 16 projects a real image in the tube 7 between it and a second objective 18. This is also mounted in a focusing sleeve 19 with clamp screw 21. The second objective 18 projects a second image which is turned twice by the total reflecting prism 22 and focused on the focal plane A—B.

It will be observed that the second reflecting surface of the prism 22 extends to the center line of the tube 6 so that on the focal plane A—B there will be two adjacent and relatively reversed images of the graduated scale 8. These images are viewed through a magnifying eye-piece consisting of two doublets 23 and 24 mounted in a tube 25 which is axially slidable in the tube 6. The tube 25 carries the usual eye-piece 27 and is moved up and down to secure accurate focusing on the plane A—B. This is the only focusing operation ordinarily performed in the use of the device, since normally the microscopes will be adjusted and locked to give the correct relative magnifications. The field of view appears as in Fig. 4.

To prepare the device for use, the first operation is to adjust the objective 13 to secure accurate focus on the plane A—B. The eye-piece is then focused. Thereafter the two objectives 16 and 18 are shifted relatively to each other to vary the magnification and still focus the image on the plane A—B. The proper magnification is determined by observation through the eye-piece. When secured the screws 14, 17 and 21 are set up. All that is necessary is to secure such an adjustment that a given number of intervals on the scale subtend the desired different number of intervals on the vernier. It follows that the optical system need not be manufactured to unreasonably precise limits. The final adjustment is made by focusing.

Since one optical system is an erecting system and the other is an inverting system, the two images viewed in the eye-piece may be made to approach each other or to recede from each other laterally by shifting the two optical systems as a unit to the right or left relatively to the scale 8 (as viewed in Fig. 1) that is, in a direction transverse to the length of the scale.

The mask 28 is mounted in or near the focal plane A—B and blocks out a part of the field, as indicated by shading in Fig. 4, in which the image of the mask is indicated by the reference numeral 28$^a$. This mask blocks out numerical graduations on one side and offers an index on the other side. The images of the vernier graduations are indicated on Fig. 4 by the reference numeral 9$^v$ and the images of the scale graduations by the numeral 9$^s$.

As already suggested the invention may be embodied in various different forms whose precise details will vary with the field of use. The optical system need not be a microscope. It may be a telescope. The principle is the same in either case.

In actual construction, it is contemplated that all the refinements familiar in the art will be introduced but they have been largely omitted from the drawing of the present application in order to permit the simplest description of the inventive principle.

What is claimed is,—

1. The method of reading a graduated scale, which consists in projecting two juxtaposed optical images of graduations of said scale, one of said images being projected on a larger scale than and in vernier relation to the other, and reading one image against the other as a vernier.

2. The method of reading a graduated scale, which consists in projecting two juxtaposed and differentially magnified optical images of graduations on said scale, the ratio of differential magnification being such as to produce a vernier relation and reading one image against the other as a vernier.

3. The method of reading a graduated scale, which consists in projecting two juxtaposed optical images of graduations on said scale, one of said images being projected on a larger scale than and in vernier relation to, and being reversed relatively to, the other; and reading one image against the other as a vernier.

4. The method of reading a graduated scale, which consists in projecting two juxtaposed and differentially magnified optical images of graduations on said scale, the ratio of differential magnification being such as to produce a vernier relation one image being reversed relatively to the other, and reading one image against the other as a vernier.

5. Apparatus for reading a graduated scale, comprising two optical systems of slightly different powers, the two systems being so related as to project adjacent images of the scale, having a vernier dimensional relation to each other and one of which may be read against the other as a vernier.

6. Apparatus for reading a graduated scale, comprising two optical systems of slightly different powers, one erecting and the other inverting, the two systems being so related as to project adjacent images of the scale, having a vernier dimensional relation to each other, and one of which may be read against the other as a vernier.

7. Apparatus for reading a graduated scale, comprising two optical systems of slightly different powers, the two systems being so related as to project adjacent images of the scale, having a vernier dimensional relation to each other and one of which may be read against the other as a vernier; and a single magnifying eye-piece through which said images are viewed.

8. Apparatus for reading a graduated scale, comprising two optical systems of slightly different powers, one erecting and the other inverting, the two systems being so related as to project adjacent images of the scale, having a vernier dimensional relation to each other and one of which may be read against the other as a vernier; and a single magnifying eye-piece through which said images are viewed.

9. Apparatus for reading a graduated scale, comprising two optical systems of slightly different powers, the two systems being so related as to project adjacent images of the scale, having a vernier dimensional relation to each other and one of which may be read against the other as a vernier; and a mask for delimiting the vernier image.

10. Apparatus for reading a graduated scale, comprising two optical systems of slightly different powers, one erecting and the other inverting, the two systems being so related as to project adjacent images of the scale, having a vernier dimensional relation to each other and one of which may be read against the other as a vernier; and a mask for delimiting the vernier image.

11. Apparatus for reading a graduated scale, comprising two optical systems of slightly different powers, the two systems being so related as to project adjacent images of the scale, having a vernier dimensional relation to each other and one of which may be read against the other as a vernier; and an eye-piece through which said images are viewed.

12. Apparatus for reading a graduated scale, comprising two optical systems of slightly different powers, one erecting and the other inverting, the two systems being so related as to project adjacent images of the scale, having a vernier dimensional relation to each other and one of which may be read against the other as a vernier; and an eye-piece through which said images are viewed.

13. Apparatus for reading a graduated scale, comprising two optical systems, so related as to project two adjacent images of the scale one of which may be read against the other as a vernier; and means for adjusting at least one optical system to adjust the relative scale of the two images to establish the desired vernier dimensional relation.

14. Apparatus for reading a graduated scale, comprising two magnifying optical systems so related as to project two adjacent images of the scale, one of which may be read against the other as a vernier; and means for adjusting the magnifying power of at least one of the optical systems to establish the desired vernier dimensional relation.

15. Apparatus for reading a graduated scale, comprising two magnifying optical systems so related as to project two adjacent images of the scale, one of which may be read against the other as a vernier; and means including two independently adjustable objectives for adjusting the magnifying power of at least one of the optical systems to establish the desired vernier dimensional relation.

16. The method of reading a graduated scale, which consists in projecting an optical image of graduations on the scale, said image being so changed in size and so directed by such projection that it appears to the eye of an observer to be juxtaposed to, and to have a vernier relation to said scale, and reading said scale by the use of said image as a vernier.

17. The method of claim 16, further characterized in that the vernier image is a magnified image.

18. The method of claim 16, further characterized in that the vernier image is a reversed image.

In testimony whereof I have signed my name to this specification.

WILLARD L. EGY.